US007743511B2

(12) United States Patent     (10) Patent No.: US 7,743,511 B2
Jerez     (45) Date of Patent: *Jun. 29, 2010

(54) POWERED DISK PREFERABLY WITH OSCILLATEABLE, TRIMMER-LINE-HOOK MOUNTS

(76) Inventor: Orlando Jerez, 3333 Delaware St., Kenner, LA (US) 70065

( * ) Notice: Subject to any disclaimer, the term of this patent is extended or adjusted under 35 U.S.C. 154(b) by 194 days.

This patent is subject to a terminal disclaimer.

(21) Appl. No.: 11/720,530

(22) PCT Filed: Dec. 1, 2005

(86) PCT No.: PCT/US2005/043327

§ 371 (c)(1),
(2), (4) Date: May 31, 2007

(87) PCT Pub. No.: WO2006/060483

PCT Pub. Date: Jun. 8, 2006

(65) Prior Publication Data

US 2008/0034724 A1     Feb. 14, 2008

(51) Int. Cl.
*A01D 34/73* (2006.01)
(52) U.S. Cl. ............................. 30/276; 30/329; 56/12.7
(58) Field of Classification Search .................. 30/276, 30/122, DIG. 5, 329, 334, 347; 56/17.1, 56/17.5, 16.9, 17.4, 12.7; 172/14, 41, 111
See application file for complete search history.

(56) References Cited

U.S. PATENT DOCUMENTS

| 3,129,771 | A |   | 4/1964 | Lidstone |         |
|-----------|---|---|--------|----------|---------|
| 3,831,271 | A |   | 8/1974 | Pedler   |         |
| 4,062,114 | A |   | 12/1977| Luick    |         |
| 4,190,954 | A |   | 3/1980 | Walto    |         |
| 4,242,794 | A |   | 1/1981 | Peterson |         |
| 4,268,964 | A |   | 5/1981 | Moore    |         |
| 4,286,675 | A |   | 9/1981 | Tuggle   |         |
| 4,374,465 | A | * | 2/1983 | Comer    | 56/295  |

(Continued)

FOREIGN PATENT DOCUMENTS

WO     WO 2006/060483 A2     6/2006

OTHER PUBLICATIONS

Notice of Allowance for U.S. Appl. No. 11/002,366, mail date of Apr. 21, 2009.

*Primary Examiner*—Stephen Choi
(74) *Attorney, Agent, or Firm*—R. Andrew Patty, II; McGlinchey Stafford, PLLC (57) ABSTRACT

A trimmer line, hook disk system forming a line trimmer head (e.g., FIGS. 10 & 10A, 19 & 20) for attaching to a powered, rotational device (FIGS. 11-16) to provide a line filament grasscutting/weed-removal action. The trimmer head preferably includes a circular, protective, bottom base (D2/60/160), a main trimmer head top (D3/D30/130), the two forming a disk shape, and a series of peripherally spaced, line holders; with these three basic elements fastened together for ultimate attachment to the powered 31 device. Ten exemplary line holder are shown (FIGS. 1-9B), with most allowing oscillating (O) motion in their attachment to the trimmer device (D1), allowing the lines to move backwardly when contacting a relatively hard item, and/or some fixed (F). A "broom" embodiment is disclosed (FIG. 17). When used, flexible line, e.g. of nylon, is inserted in (1) and held (2) by the line holders preferably using hook or hook-like line attachments.

7 Claims, 7 Drawing Sheets

U.S. PATENT DOCUMENTS

| | | |
|---|---|---|
| 4,501,332 A | 2/1985 | Straayer |
| 4,513,563 A | 4/1985 | Roser et al. |
| 4,856,194 A | 8/1989 | Lee |
| 4,862,682 A | 9/1989 | Wait et al. |
| 4,905,465 A | 3/1990 | Jones et al. |
| 4,962,630 A | 10/1990 | Jones |
| 5,023,998 A | 6/1991 | Masciarella et al. |
| 5,092,112 A | 3/1992 | Buckendorf, Jr. |
| 5,197,264 A | 3/1993 | Lacey |
| 5,303,476 A | 4/1994 | Tuggle |
| 5,345,788 A | 9/1994 | Jerry |
| 5,361,570 A | 11/1994 | Bernardy |
| 5,426,852 A | 6/1995 | Macomber |
| 5,430,943 A | 7/1995 | Lee |
| 5,489,889 A | 2/1996 | Kambouris et al. |
| 5,491,963 A | 2/1996 | Jerez |
| 5,493,783 A | 2/1996 | Oostendorp |
| 5,615,543 A | 4/1997 | Caffey et al. |
| 5,617,636 A | 4/1997 | Taggett et al. |
| 5,622,035 A | 4/1997 | Kondo et al. |
| 5,651,418 A | 7/1997 | Jerez |
| 5,722,172 A | 3/1998 | Walden |
| 5,758,424 A | 6/1998 | Iacona et al. |
| 5,761,892 A | 6/1998 | Quiroga |
| 5,862,655 A | 1/1999 | Altamirano et al. |
| 5,881,464 A | 3/1999 | Collins et al. |
| 5,887,348 A | 3/1999 | Iacona et al. |
| 5,896,666 A | 4/1999 | Iacona et al. |
| 5,970,693 A * | 10/1999 | Ciaglo ........................ 30/276 |
| 5,979,064 A | 11/1999 | Kitz et al. |
| 6,038,842 A | 3/2000 | Quiroga |
| 6,052,974 A | 4/2000 | Harb |
| 6,094,825 A | 8/2000 | Hinson |
| 6,108,914 A | 8/2000 | Sheldon |
| 6,185,916 B1 * | 2/2001 | Johnson ..................... 56/17.5 |
| 6,240,643 B1 | 6/2001 | Civalleri |
| 6,247,539 B1 | 6/2001 | Jerez |
| 6,357,214 B1 | 3/2002 | Iacona |
| 6,374,585 B1 | 4/2002 | Legrand |
| 6,457,242 B1 | 10/2002 | Fogle |
| D465,975 S | 11/2002 | Iacona |
| 6,519,857 B1 | 2/2003 | Proulx et al. |
| 6,594,907 B2 | 7/2003 | Wilson et al. |
| D479,961 S | 9/2003 | Iacona |
| 6,643,938 B2 | 11/2003 | Livingston |
| 6,715,270 B1 | 4/2004 | Yandle, II |
| 6,722,040 B2 | 4/2004 | Sullivan |
| 6,735,874 B2 | 5/2004 | Iacona |
| D496,840 S | 10/2004 | Iacona |
| 6,827,152 B2 | 12/2004 | Iacona |
| D532,263 S | 11/2006 | Iacona |
| 7,257,898 B2 | 8/2007 | Iacona |
| 2002/0073556 A1 | 6/2002 | Fogle |
| 2003/0037442 A1 | 2/2003 | Lyon |
| 2003/0155137 A1 | 8/2003 | Iacona |
| 2003/0226261 A1 | 12/2003 | Iacona |
| 2005/0229402 A1 | 10/2005 | Iacona |
| 2005/0257940 A1 | 11/2005 | Jerez |
| 2006/0112568 A1 | 6/2006 | Jerez |
| 2007/0130781 A1 | 6/2007 | Iacona |
| 2008/0010836 A1 | 1/2008 | Iacona |
| 2008/0116218 A1 | 5/2008 | Iacona |
| 2008/0168664 A1 | 7/2008 | Iacona |
| 2009/0038163 A1 | 2/2009 | Jerez et al. |

* cited by examiner

POWERED DISK PREFERABLY WITH OSCILLATEABLE, TRIMMER-LINE-HOOK MOUNTS

RELATED U.S. PATENTS

This application relates to some of the same subject matter as the inventor's prior U.S. Pat. No. 5,491,963, issued Feb. 20, 1996, entitled "Garden Cleaning Implement for Cutting/Macerating Weeds Above & Below the Ground;" U.S. Pat. No. 5,651,418, issued Jul. 29, 1997, entitled "Convertible, User-Supported, Garden Cleaning Implement For Cutting/Macerating Weeds and Like;" and U.S. Pat. No. 6,247,539 issued on Jun. 19, 2001, entitled "Cultivator Implement with Castellated Cultivating Protrusions and Multi-Implement, Powered, Cultivation System," the disclosures of which are incorporated herein by reference for general background information. However, it should be understood that the present invention is directed to a different, independent invention than those of the above prior patents.

TECHNICAL FIELD

The present invention to weed trimming and grass cutting using flexible line, such as, for example, nylon line, which is rotated at a relatively high speed. It eliminates the spool and "bump 'n' feed" method of weed trimming of the prior art. Instead it uses a base carrying a series of spaced, line holders on the base or disk having easy means of inserting, holding and/or removing multiple trimmer lines, with the line holders connections to the base either preferably allowing some oscillatory motion of the holders with respect to the base or may be fixed to the base or disk in some embodiments hereof. The base, which preferably is circular, serves as a shield or protector of the proximal portions of the line and its respective holders during use. The line holders preferably use a hook or hook-like structure into which each line, after being folded in half to form an extended "U", is inserted into and held by the hook or hook-like structure. (It is noted that, in the context of this specification, the term hook-like structure includes a hook structure.)

This over-all structure forms a trimmer head which is attached to a powered device which causes the trimmer head to rotate at relatively high speeds.

The present invention thus relates to, for example, a hand-held, powered tool either with a very long handle or of a compact, hand-gun-like design or the like, for doing various chores, mostly garden-related, generally characterized in the long handled version as a "Weed-Eater" type of device, or alternatively to a wheeled type, powered device in which the user walks behind the device.

The present invention also relates to a powered, user-two-hand-held, long handle, garden trimming device or unit which is used to remove weeds and the like out of, for example, a garden. Some of the principles of the present invention can also be adapted to form a "broom" or de-thatcher or the like.

BACKGROUND ART

There have been many trimmer devices in the prior art having a rotatable, attachable head for attachment to a powered device, with the head carrying a series of trimmer lines extending axially out about the head's periphery. However, it is currently believed that none of them included, for example, a moveable mounting for the lines on the head which allow the lines, when they strike, for example, a solid object, such as a fence or a rock or a wall, or the like, will allow the trimmer line mounting to swing back while the head continues to rotate, much less the innovative details of the oscillateable line mounting system or the innovative designs of the hook-like trimmer line holder portions of the preferred embodiments of the present invention.

Thus, in this relatively "crowded" art, there are substantial, innovative, "unobvious" differences between the present invention and the prior art, as brought out more fully below. It is believed that the present invention represents an innovative, substantial advance in the prior art and a valuable contribution to the "useful arts."

GENERAL SUMMARY DISCUSSION OF INVENTION

As previously noted, the present invention weed trimming and grass cutting uses flexible line, such as, for example, nylon trimmer line, which is rotated at relatively high speed, as well known in the prior art. It eliminates the spool and "bump 'n' feed" method of weed trimming of the prior art. Instead it uses a disk-like device carrying a series of preferably equally spaced, line holder parts in a balanced array on the disk-like structure having easy means of inserting, holding and/or removing multiple trimmer lines, with the line holders' connections to the disk-like structure preferably allowing some oscillatory motion of the holder parts with respect to the disk-like structure. The bottom of the disk-like structure includes a base, which preferably is circular, and serves as a shield or protector of the proximal portions of the line and its respective line holders during use. The line holders preferably use a hook or hook-like structure into which each line, after being folded in half, is inserted into and held by the hook or hook-like structure. This over-all structure forms a trimmer head which is attached to a powered device which causes the trimmer head to rotate at relatively high speeds.

The invention's preferred security nylon restraint elements provide for string security as well as fast and easy nylon or other trimmer line insertion.

The special design in the trimmer head, as well as in the security nylon restraint, allows special oscillating motion, if so desired. The user may also have the option to install security nylon restraint in a fixed mode which will have the same benefits in string security, as well as, easy and fast nylon insertion, but without the oscillatory function, that is, it is fixed.

Oscillating motion in string concept of the invention insures that, because of the oscillation motion of the security nylon restraint element, the nylon lines are not subject to the ordinary stresses that conventional, weed head attachments are subject to and thus promotes longer lasting nylon lines or other types of line that might be used in place of nylon line. When contact (with, for example, hard grass, rocks, fences, and other fixed objects, etc.) is made, the flexibility that the oscillating "security nylon restraint" offers; insures that the nylon (or other line), instead of stressing at the point of contact, absorbs the impact and makes like, for example, a swooping motion, while cutting, and then returns to the extended, orthogonal or radial position under the action of centrifugal forces, when such impeding contact no longer exists.

For example, in connection with the conventional trimmer head, imagine a person holding a broom stick (with little flexibility) extended over his shoulder from end to end and spinning (rotating); the person being the trimmer head and the arms and broom stick being the nylon string. As the person (head) spins or rotates, the broomstick (string) hits a relatively hard object (for example, hard grass, fence, etc.). This impact causes friction and possibly stops or hinders the rotation of the person (head), thus causing the broomstick (string) to possibly break off.

In contrast, with the trimmer head of the preferred embodiments of the invention, the person (head) will holds the two, equally cut pieces of broom on each end with the security nylon restraint being the shoulder which will create the line flexibility even if the broom offers no flexibility. When contact is made, the shoulders (security nylon restraint) will absorb with little or no recoil and will be forced to move in the opposite direction of the trimmer rotation.

Also, with the typical, conventional trimmer head of the prior art, the nylon string comes out of an eyelet. When rotating the nylon string, the string or line tends to be straight out due to the action of centrifugal force, and the flexibility is with the trimmer line itself only. With this motion (back and forth), it creates friction which thus creates heat, and this makes the string vulnerable, brittle, and more prone to breakage.

The preferred embodiments of the present invention have one or more and in some cases all of the following desirable qualities—(01) Highest quality component providing longer product life; (02) Provides impact reduction, making the line more resistant; (03) Provides cut in small spaces such as between rocks and bricks and the like; (04) Clean cuts; (05) Durability for higher impact up to twenty to thirty (20-30%) percent longer; (06) Easy and longer cutting edger; (07) Flexibility of cutting edger; (08) Outstanding impact toughness; (09) Easy to attach; (10) Cuts in between obstacles; (11) Reduces time and effort; (12) Easy to replace and remove line; (13) More effective; (14) More durable; (15) Re-loading with quickness and ease; (16) Long lasting, super tough trimmer wipe; (17) Change new cutting line in just seconds; (18) Converts standard trimmers into powerful filament line cutters or trimmers; (19) Can be used on commercial and residential trimmers; (20) Uses practically any line and shape; (21) Outstanding toughness designed or engineered for ultimate impact resistance; (22) Clean cuts, minimizing or substantially reducing browning of cut grass tips; (23) No bump, spool, or their resulting tangles; (24,) Provides precision edging along sidewalks, curbs, flower beds, etc.; (25) Perfect head for those who want simplicity; (26) Very simple to feed nylon line into head; (27) Substantially never fails in operation; just feed a piece of nylon line and keep cutting; (28) No more need to disassemble head and winding spool; (29) Stops constant line breaking as in prior art; (30) Allows use of various size line from, for example, about 0.065" to about 0.105"; (31) No disassembling; and/or (32) The world's easiest to load string trimmer head.

The foregoing and additional features and approaches of the present invention further are disclosed and discussed below.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

[It is noted that top element (D3), described below, illustrates an exemplary main trimmer head member or circular substrate onto which all the previously mentioned line holders can be selectively inserted and attached.]

In the drawings and descriptions above it also is noted that the letter "O" stands for "Oscillating" and the letter "F" stands for "Fixed" for the various trimmer line mounts illustrated

EXEMPLARY MODES FOR CARRYING OUT THE INVENTION

The initial, accompanying figures (FIGS. 1-16), as well as the others that follow, show exemplary parts of a total concept which involves trimming and grass cutting as in a conventional weed trimmer apparatus. It works as a fixed or oscillating member of the rotating trimmer head attachment or add-on to a powered device, such as, for example, a "Weed Eater" type of device.

When it is used in the oscillating mode, bolts or pins or other appropriate mechanical elements or devices are used in order to provide or allow this motion. The oscillation motion makes the trimmer line more durable [up to, for example, in the preferred, exemplary embodiment about twenty (20) times longer than a conventionally mounted, trimmer attachment line] and resists or reduces impact from such fixed items as rocks or bricks, etc. With this trimmer head attachment, overall performance in trimming and edging is achieved. With the oscillating motion concept, the trimmer line will last longer because of the flexibility that it offers. Also, trimmer line replacement is fast and easy due to the typically open, hook or hooklike line attachments used in the exemplary embodiments.

Figure 10:
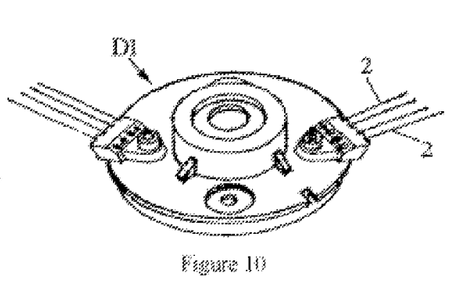
FIG. 10 (D1) is a perspective view showing an exemplary embodiment of a fully assembled trimmer head with the exemplary line holder of FIG. 4 (O) being attached to the circular substrate or base members forming a protective disk described more fully below.
Figure 10A:
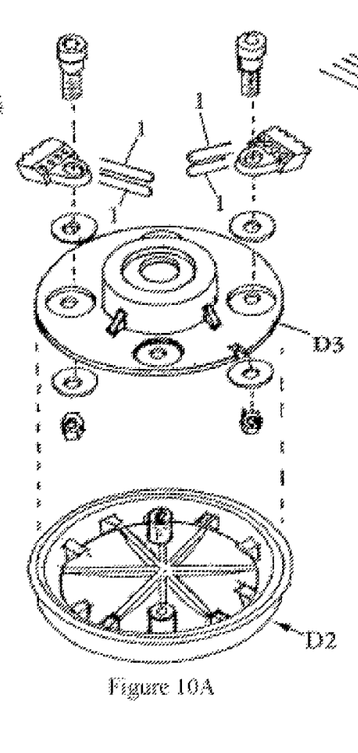
FIG. 10A (D2/D3) is an exploded, perspective view of the trimmer head of FIG. 10 showing its elemental parts, including the bottom, protective part (D2) that goes underneath the main head substrate or base disk (D3) of FIG. 10; while FIG. 10B (D2/D3/D4) is an exploded, perspective view of the trimmer head of FIG. 10 showing its elemental parts, including the bottom, protective part (D2) that goes underneath the main head substrate or base disk (D3) of FIG. 10 and with an exemplary embodiment of a metal gasket type element (D4) that is used to support and/or reinforce the various mechanisms mentioned, it being noted that the support gasket can be placed below the line holders, if so desired.
Figure 10B:
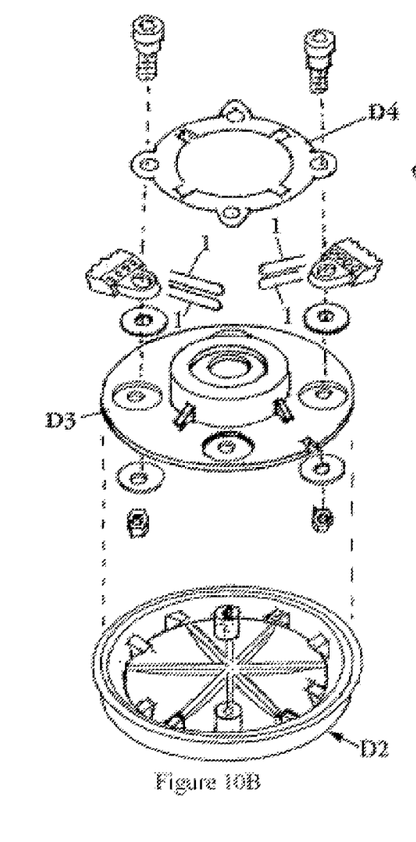

The over-all line trimmer head (D1) is best illustrated assembled in FIG. 10 and in exploded views in FIGS. 10A & B, with the latter adding a metal gasket (D4) for reinforcement. As can be seen, the over-all line trimmer head (D1) includes: —a circular, protective base or bottom (D2), a circular, main trimmer head or body or substrate (D3) and a series of peripherally spaced line holders; with these three basic elements attached together with appropriate fasteners, for example, bolts and nuts, and, where appropriate, washers, and/or screws, all as illustrated. It is noted that the substrate and the base are circular, forming in combination a disk like shape having a circular periphery past which the flexible trimmer lines extend out a number of inches when attached to the line holders.

When in use, flexible line made, for example, of nylon, is inserted in and held by the line holders preferably using hook or hook-like line attachments or holes extending completely through and out its respective line holder.

Thus, each line holder has a series of at least three (preferably five), adjacent, side-by-side, parallel, backwardly extending, hook fingers with the middle one serving as a central member about which bent back (extended "U" shape), flexible trimming line is inserted with the central crook of the bent back line being wrapped around said central member and with the rest of the line positioned in the spaces formed between the two other, outer, finger members and their respective central member.

Alternatively, the hook or hook-like structures include at least two (preferably four), spaced openings and a central member having a top and is located between the openings into which the flexible trimming line bent back on itself (1) is placed (2), with the middle or crook of the line being held under the top with its two lengths extending around the central member and completely out through the openings, with the top serving to hold the line down against the central member, trapping it. When the line is rotated at relatively high speeds, centrifugal force forces the line further into its respective hook attachment, strengthening the attachment of the line(s) to the line holder(s).

Preferably at least two such hook attachments are included in each line holder, with a series (e.g., two), peripherally spaced around the combined circular head members (D2 & D3 combined) equally spaced, producing four line extensions at each line holder or a total of eight line extensions. In the embodiments illustrated in FIGS. 10, 10A & B, the two line holders are spaced opposed to one another positioned at, for example, the zero) (0° degree and one hundred and eighty) (180° positions. Additional holes in the main head member (D3) are included at the ninety) (90° degree and three hundred and sixty) (360° degree positions are used for attaching the bottom member (D2) with the upper, main head member (D3) using, for example, screws (not illustrated) or other appropriate fasteners.

Currently one of the most preferred embodiment or mode is that illustrated in FIGS. 10 & 10A. The following are exemplary, approximate dimensions (subject to great variation) for this embodiment:

| | |
|---|---|
| overall diameter of head substrate (D3) | 4" |
| diameter of central, raised island | 1.5" |
| length of line holder (front to back) | 1.1" |
| Nylon line length (end to end) | 11" |
| Extension of distal line ends past periphery | Several inches+ |
| diameter of central, island opening | 0.6" |
| centerline/axis separation distances (center to holder axis) | 1.4" |
| width of line holder | 1" |

The materials for the trimmer head members (D2, D3) may be made of plastic or other suitable material, and the material for the line holders likewise can be plastic or metal or other appropriate material.

Figure 1:
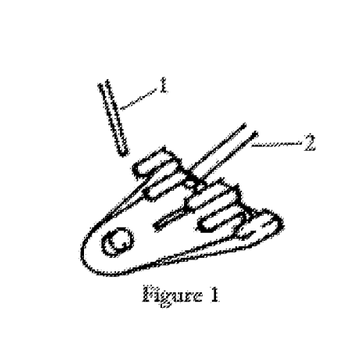
FIG. 1 (O/F) is a perspective view of an exemplary, first embodiment of a line holder which can be used as a component part of the trimmer head of the present invention, with an exemplary trimmer line off to the side showing how it is bent over in half before being hooked into the line holder with anther trimmer line shown actually hooked into the line holder.
Figures 2, 3:
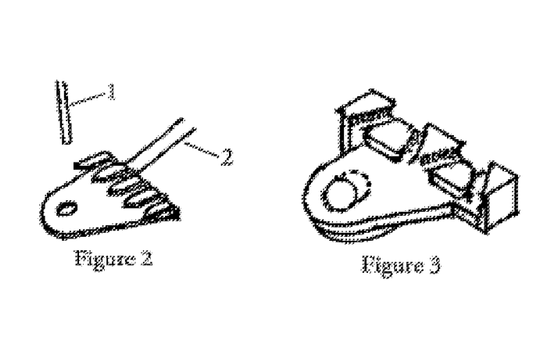
FIG. 2 (O/F) is a perspective view of an exemplary, second embodiment of a line holder which can be used as a component part of the trimmer head of the present invention, likewise with an exemplary trimmer line off to the side showing how it is bent over in half before being hooked into the line holder with anther trimmer line shown actually hooked into the line holder.
FIG. 3 (O/F) is a perspective view of an exemplary, third embodiment of a line holder which can be used as a component part of the trimmer head of the present invention.

As indicated above, ten exemplary line holders are shown in FIGS. 1-9B, respectively. In the embodiments of FIGS. 1 & 2, the hook-like line attachments (two) are provided by a series of five, backwardly projecting, spaced "fingers" with fingers "2" and "4" forming the central members and the spacings between those fingers and the immediately adjacent fingers forming the openings. In the embodiment of FIG. 3 the hook-like attachments are provided by spaced plateaus preferably with curved side walls forming the tops. In the embodiments of FIGS. 4-7 and 9A & 9B, the hook-like attachments are provided by spaced holes, two for each line (two doubled over lines being preferred), with the solid material between each pair of holes serving as the central member and the tops of each hole effectively or equivalently providing the top of the hook.

The line holders are mounted on the main trimmer head (D1) either for free oscillation, i.e., moving back and forth about a "vertically" disposed, central axis under the forces the associated lines may encounter or is fixed, depending on how the line holder is attached to the trimmer head and/or what fasteners are used, or, most preferred, the line holder has the capabilities of both, oscillation and fixed and set with no movement, again depending on how the line holder is attached to the trimmer head and/or what fasteners are used.

The range of oscillation is limited by the sides of the line holder coming into contact with a raised (e.g., cylindrical), central "island" on the main trimmer head substrate (D3); see FIGS. 10-10B, as the holder swings back and forth. A central opening is located at the very center of the device, which is the center of the "island" which is used to attach the line trimmer head to a powered device by either a bolt or a nut, depending on the end connection of the powered device, as is well known in the art.

Upwardly projecting stops, formed for example, by the sides of the centrally located "island" on the upper side of the substrate which the maximum amount of oscillating swing of the line holders, with the maximum amount of oscillating swing allowed being about one hundred and eighty) (180° degrees to and fro or back about ninety) (90° degrees.

The line holder embodiment of FIG. 1 (O/F) is composed of two parts. One (the top section) has two (2), exemplary hook members to insert the line and the other (bottom section) which has three (3), exemplary hook members to support (or lock) the line with the coordinated benefit of the centrifugal force which pushes the line out. The top section with the two (2) hooks has a large hole (opening) in order to move back and forth for the locking system. This is where the nylon trimmer line 2, which is bent in half creating a loop or extended "U" shape, is inserted. The bottom has a round hole in order for the oscillation movement to take place. These two sections are held in place by a male-to-female notch and flange. [It is noted that these two plates or parts can be inverted or switched in position (top to bottom or bottom to top). In this case there is no need to have male/female tracking.]

The line holder embodiment of FIG. 2 (O/F) includes an exemplary five (5) hook members or fingers extending toward the rear of the line holder. The nylon line is inserted (after being bent back in half forming a "U" shape) with an up/down motion in between the hook members being set or even wedged or inserted evenly loosely into the hook formed by a set of three such fingers.

The line holder embodiment of FIG. 3 (O/F) has basically the same function as the embodiment of FIG. 1 (O/F), but with the addition of concave teeth to support or bite the trimmer line into place.

Figures 4, 8:
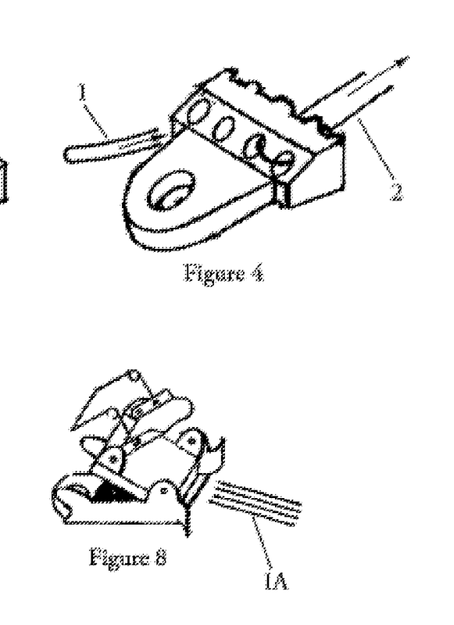
FIG. 4 (O) is a perspective view of an exemplary, fourth embodiment of a line holder which can be used as a component part of the trimmer head of the present invention.
FIG. 8 (O/F) is a perspective view of an exemplary, eighth embodiment of a line holder, which in this embodiment is in the form of spring/clamp type mechanism with "teeth" to bite down on the trimmer line holding it in position.

The line holder embodiment of FIG. 4 (O) is used for oscillation. The insertion is be made from the inside/out position, which allows for centrifugal force to have action during rotation. If so desired, flanking bumps can be added where the strings come out for added line protection.

Figure 5:
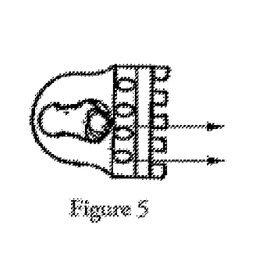
FIG. 5 (O) is a plan view of an exemplary, fifth embodiment of a line holder which can be used as a component part of the trimmer head of the present invention.

The line holder embodiment of FIG. 5 (O) provides basically the same function as the embodiment of FIG. 4 (O) with the exception of the tapered opening which is used to lock the apparatus to a trimmer head attachment that is equipped with a bolt-like hooking mechanism. This part has a "locking pin" or "security pin" on the bigger opening, which insures that this part will stay in place and remain secure while in motion. Nylon trimmer line, for example, can be inserted prior to locking the part onto the head attachment.

Figure 6:
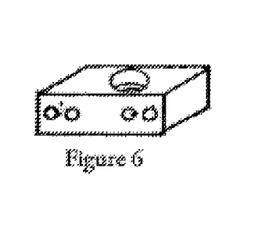
FIG. 6 (O) is a perspective view of an exemplary, sixth embodiment of a line holder which can be used as a component part of the trimmer head of the present invention.

The line holder embodiment of FIG. 6 (O) is basically the same as that of FIG. 5 (O) with the exception of being attached by the bolt in front of the trimmer line opening as opposed to the back.

Figure 7:
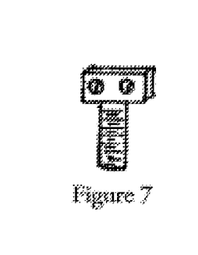
FIG. 7 (O) is perspective view of an exemplary, seventh embodiment of a line holder, which in this embodiment is in the form of a bolt type mechanism that has trimmer line openings on it's head part, which bolt device is inserted to the head on a vertical position.

The line holder embodiment of FIG. 7 (O) is a bolt type mechanism that has a trimmer line opening on it's head part. This bolt is inserted into the head in a "vertical" position.

The line holder embodiment of FIG. 8 (O/F) uses a spring/clamp type mechanism with "teeth" or a straight edge to bite down on the trimmer line, which line due to the clamping action can be in the form of a series of single, straight lines 1A (not doubled over), and hold it in place.

Figure 9A:
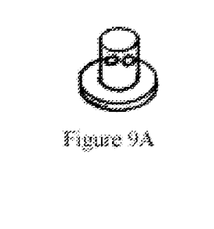
FIGS. 9A (O) and 9B (O) are perspective views of exemplary, ninth and tenth, similar embodiments, respectively, of line holders, which in these embodiments are in the form of mechanisms that selectively may be sandwiched between the elements (D2 and D3) shown in FIGS. 10A & B discussed below, wherein, for example, bent-back nylon line is inserted into the two, exposed holes or four, exposed holes, respectively, which come out of FIGS. 10A & B (D3).

The line holder embodiments of FIGS. 9A (O) and 9B (O) are in the form of mechanisms that selectively may be sandwiched between the top and bottom elements (D3 and D4) shown in FIGS. 10A & B and discussed further below, wherein, for example, bent-back nylon line (1) is inserted into the two, exposed holes or four, exposed holes, respectively, which come out of FIGS. 10A & B.

It is noted that FIG. 10 show a fully assembled, trimmer head (D1, made up of D2 & D3, etc., see FIGS. 10-10B) onto which all the previously mentioned apparatus will be inserted and attached, while FIG. 10A shows in its exploded array the details of the exemplary bottom, protective part or shield (D2) that goes underneath the main trimmer head substrate (D3).

FIG. 10B which is nearly identical to FIG. 10A, but also shows in its exploded array the details of the exemplary embodiment of an optional, metal gasket type (D4) that is used to support and/or reinforce the various mechanisms mentioned.

Figure 11:
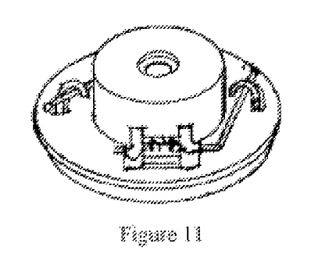
FIG. 11 has the same basic function as the embodiment of FIG. 8 (O/F) with the exception that the trimmer head is equipped with two, protruding "candy cane" shaped hooks onto which the spring-loaded mechanism is attached or held in place.

FIG. 11 (F) provides the same basic functionality as the main head trimmer part (D2, D3) of the embodiment of FIG. 10 but is used for mounting, for example, the line trimmer embodiment of FIG. 8 (O/F) with the difference that the trimmer head is equipped with, for example, two protruding "candy cane" shaped hooks onto which the spring-loaded mechanism is attached and held in place.

With general reference to FIGS. 12-16 and with the nylon guard section of this system, which can be used with the standard weed trimmers, walk behind trimmer mowers, standard push mowers and riding lawn mowers. The function is the same—"to protect cutting members, trimmer lines, etc."

The main function of this protective device is to reduce the total access or exposure of the of the string (1, 2) is used. This is due to the special guard/string protector which is attached to the above mentioned. The guard only allows the tip of the string to have access to grass/weed, etc.

This action reduces the friction that the exemplary nylon line encounters upon contact with weed, grass, rocks, fences, etc., usually located below the trimmer head D1.

The guard also helps to support the weight of string trimmer, walk-behind etc. This is done by having the guard or protector shield rest on the cutting surface. The end part of the guard also performs as a debris body protector.

The attachment is good for edging and especially guiding around round edges. With this attachment, it is easy to follow the contour of the ground. This preferably is an adjustable guard that produces the desired height of cut grass, as may be selected by the user.

Figures 12, 13, 14, 15, 16:
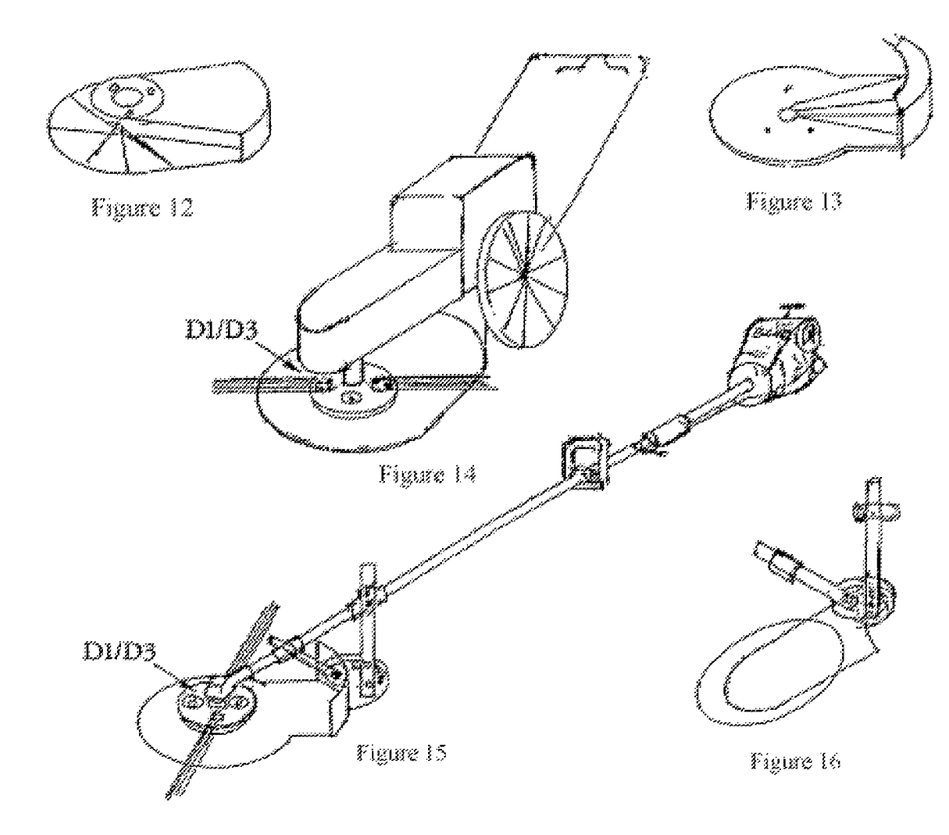
FIG. 12 is a perspective view of an exemplary guard and nylon line protector for use in conjunction with, for example, the mentioned "main trimmer head" (D1/D3, see FIGS. 10A & 10B).
FIG. 13 is a perspective view of an exemplary guard having basically the same function as the embodiment of FIG. 12 but different in that the main head (which is attached to a trimmer shaft) is located on top of the guard/line protector apparatus.
FIG. 14 is a perspective view showing a walk-behind trimmer/mower with the main head (D1/D3) attached and with the guard/line protector shown in FIG. 13.
FIG. 15 shows another example of the guard/line protector in a "universal" mode with the main head (D1/D3) attached and in which exemplary curved or straight shaft trimmers may be attached.
FIG. 16 is a perspective view which illustrates another variation which also is "universal" and which is made of exemplary curved metal rods for extra strength, as well as stability to reinforce, for example, a plastic guard.

The protector embodiment of FIG. 12 provides an exemplary guard and nylon protector. It is used with the mentioned "main trimmer head" (D1). This is, for example, a one piece apparatus with the top portion having, for example, three (3) holes for attaching it to the trimmer system and the bottom section which protects the trimmer line in that it will only expose a certain amount of extended or distal line where the main cutting takes place, while providing protection to the line holder mechanism on which the line is attached or held and the associated, proximal line portions. This protective action reduces the friction and or stress that the line otherwise would incur while also reducing the stress on the trimmer motor.

This is so because only the outer, distal or smaller portion of the line is being used. In contrast, with a conventional trimmer head, all or nearly all of the nylon lines are exposed, thereby creating un-desired stress and friction on the lines as well as on the motor. With this part of the concept of the invention, it will help guide in edging and provide better directional control of handheld trimmers. This concept can be used with hand held trimmers (see FIG. 15) as well as walk-behind trimmers (see FIG. 14 discussed below) and the like. The supplemental protector embodiment of FIG. 12 is used with the "main head" (D1) and all of its line attachment mechanisms that are "O/F" in type.

The embodiment of FIG. 13 has basically the same function as the embodiment of FIG. 12 but different in that the main head (which is attached to a trimmer shaft) is located on top of the guard/line protector apparatus.

FIG. 14 shows a walk-behind trimmer/mower with the main head (D1) attached and with the guard/line protector of FIG. 13.

FIG. 15 shows another example of the guard/line protector in a universal mode in which curved or straight shaft trimmers may be attached.

FIG. 16 illustrates another variation which also is "universal" which is made of curved metal rods for extra strength, as well as stability to reinforce a plastic guard.

Figure 17:
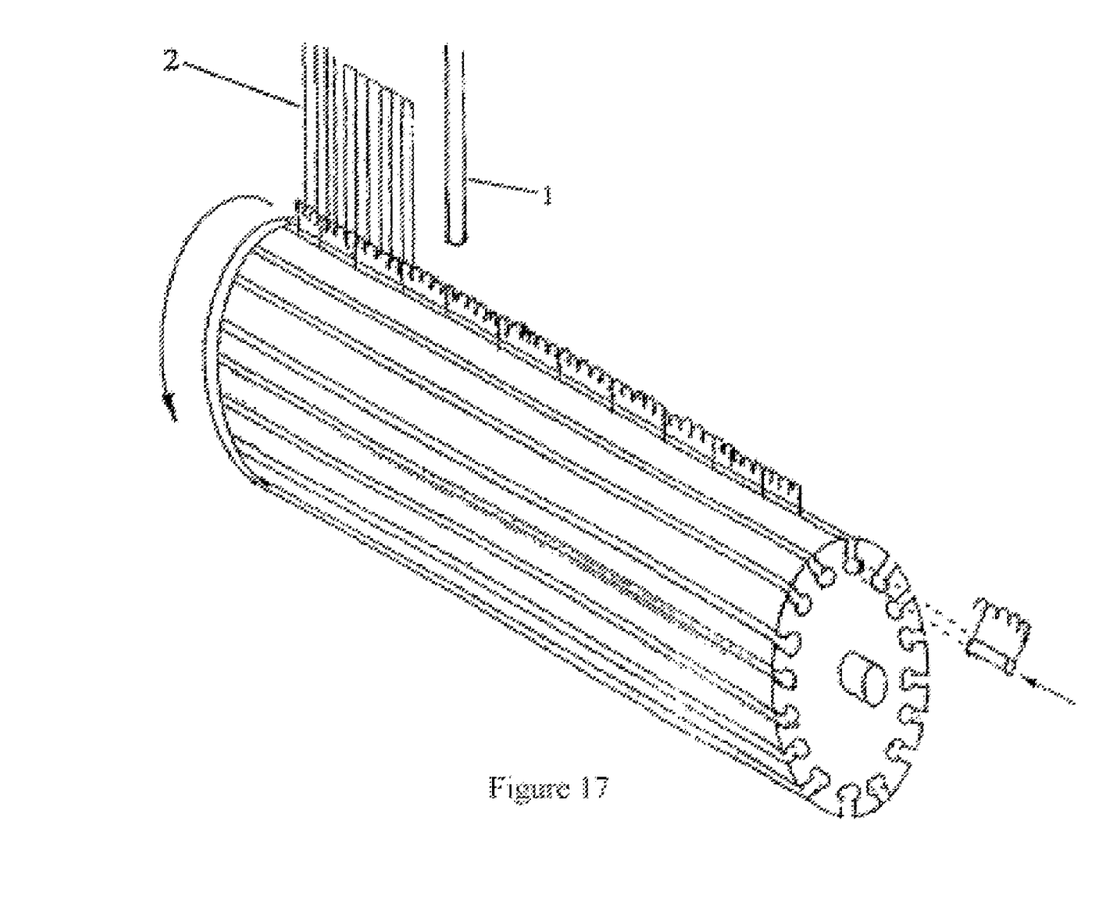
FIG. 17 is a perspective view of a further exemplary embodiment of the invention which is useful as, for example, a "broom" or de-thatcher, etc. it being noted that, for the purposes of this specification and claims, the term "trim" or "trimmer" and variants thereof generically cover this "broom" embodiment with the "whisks" or sweeping, flexible lines of the "broom" being equivalent to trimmer lines.

FIG. 17 is a perspective view of a further exemplary embodiment of the invention which is useable, for example, as a "broom" or de-thatcher, etc.

"Broom" Embodiment

Mode (FIG. 17)

Thus, a further exemplary embodiment is illustrated in FIG. 17 which can be used in the fashion of, for example, a "broom." Parallel, longitudinally extended, peripherally located and circumferentially spaced tracks formed in a longitudinally extended, cylinder body are used to hold a side-by-side series of the line holder elements with line hooks which are inserted into the tracks, all as can be seen in the figure. The claws or hooks slide into the tracks and appropriate means are used, for example, an end plate, to hold the hook elements in the track, thus preventing them from coming back out.

This embodiment provides a quick and easy change of the trimmer line 2 (1) which now effectively serve as the whisks, straw, strings or lines of a broom. The direction of rotation also has to go the same way as the hooks or the strings/lines will tend to fall out. The basic concept of this embodiment also can be used as a de-thatcher. It at least generally will not damage turf root system, sprinkler heads, paving stones, concrete, or black top, etc. This embodiment can also be used to remove grass. Two to four tracks or more can be used, depending on the driving engine's capacity.

The strings or lines 2 (1) should be balanced out with respect to the tracks to provide relatively smooth, balanced rotation. The hook-like line holding elements should be equally inserted on opposite sides of the tracks for balancing. The distal ends of the claw or hook members inserted on the tracks can be like those illustrated in FIGS. 1, 2, etc., as described above in connection with the other, various line holder embodiments.

It should be understood that, for the purposes of this specification and claims, the term "trim" or "trimmer" and variants thereof generically cover this "broom" embodiment with the "whisks" or sweeping, flexible lines of the "broom" being equivalent within the context of this specification to trimmer lines.

Currently Most Preferred Embodiment

Figures 18A, 18B, 18C, 18D:
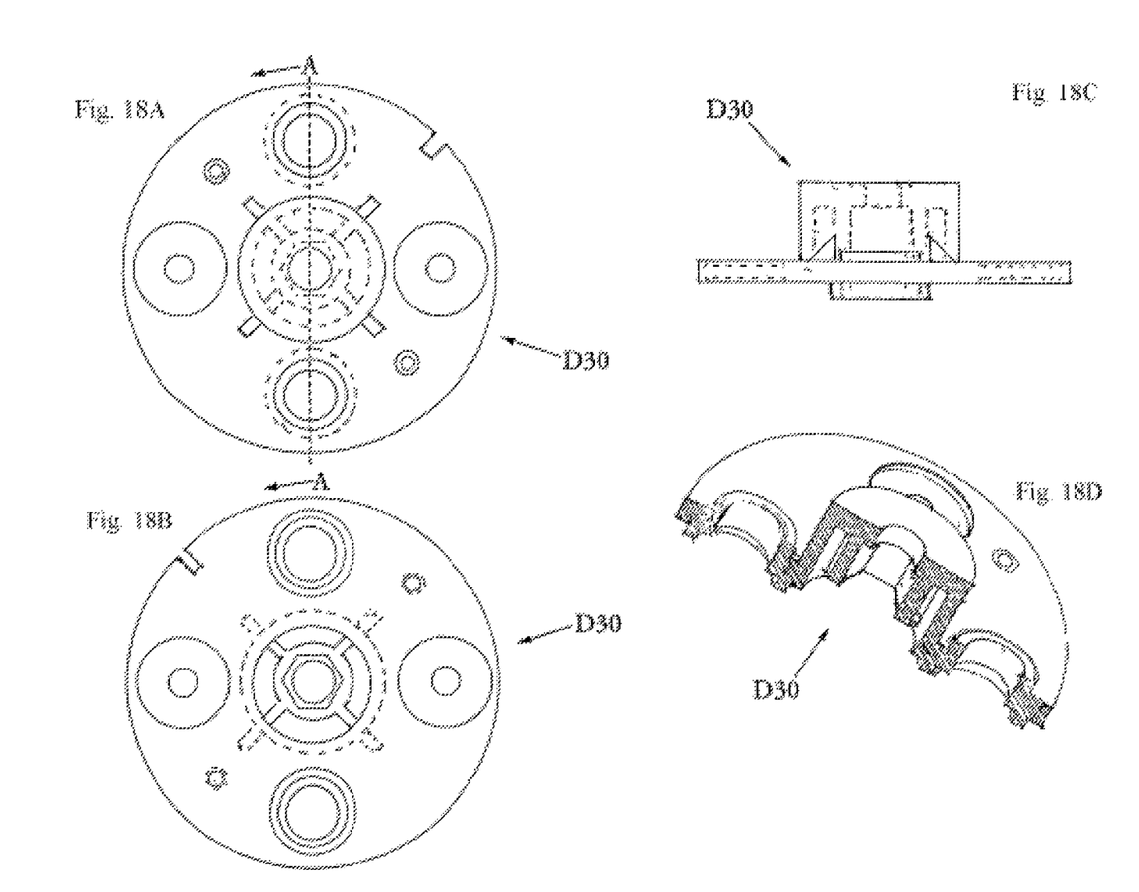
FIGS. 18A, 18B, 18C & 18D are a top view, a bottom view (180° counter-clockwise rotated with respect to FIG. 18A), a side view and a perspective, center-line, cross-sectional view, taken along section line A-A of FIG. 18A, respectively, with the interior dash lines indicating structure directly unseeable in the respective figure, of the currently most preferred embodiment or mode of the top element D30 of the present invention, showing a variation of top member D3 (see FIGS. 10-10B).
Figure 19:
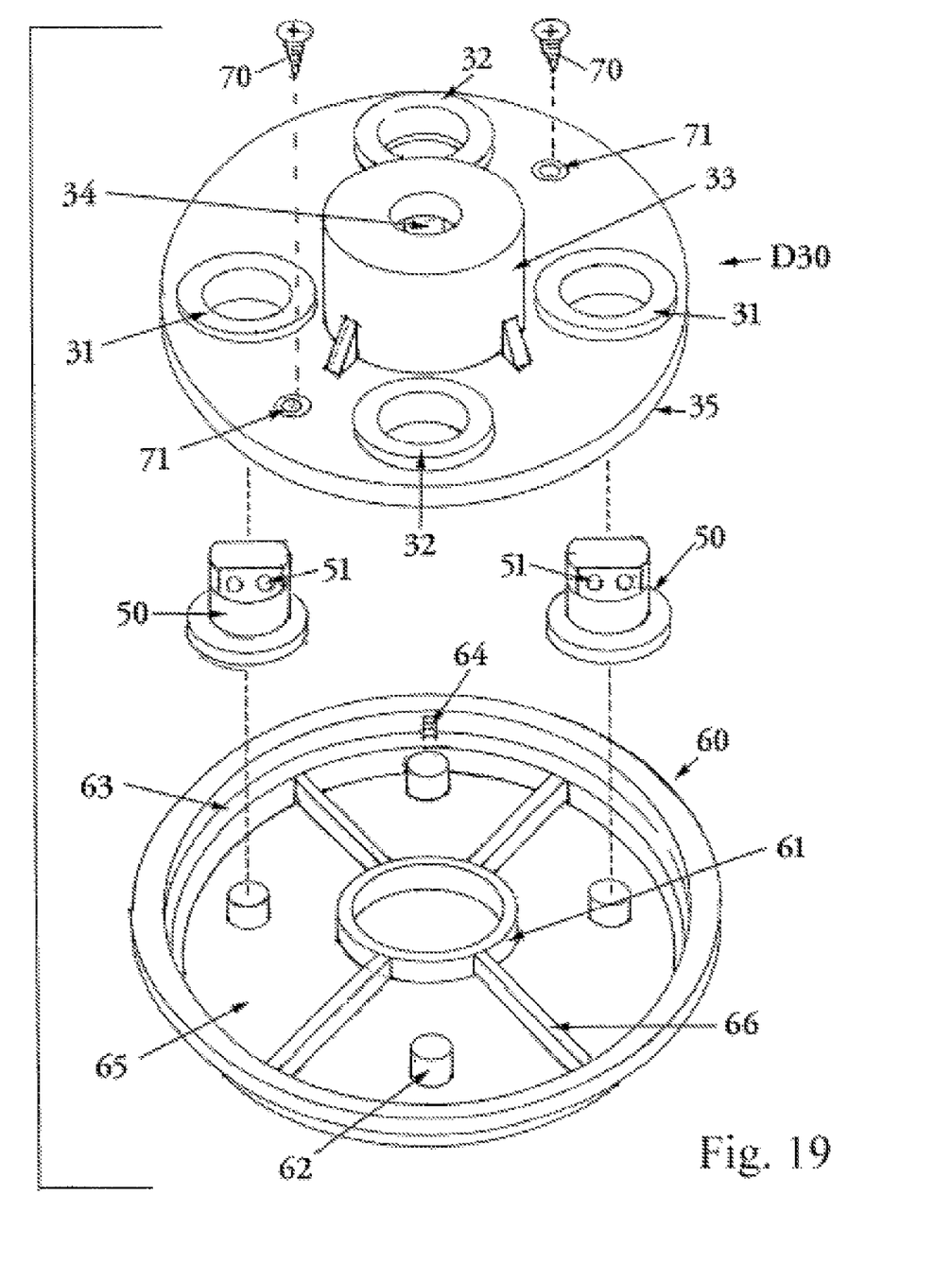
FIG. 19 is an exploded view of a further embodiment or mode using the top part D30 illustrated in FIGS. 18A-D with the bottom part (60, similar to D2 of FIGS. 10 & 10B) and the line holders (50) to be held oscillateably in place between the separable, top part and the separable, bottom part when the illustrated screws fasten the parts together.

Mode (FIGS. 18 & 19)

A further exemplary embodiment is illustrated in detail in FIGS. 18A-D for the top D30, which is very similar to the top portion D3 in FIGS. 10 & 10A. As can be seen in FIG. 19, the top portion D30 is ultimately joined with the bottom portion 60 (similar to D2 in FIG. 10B) but with the bottom portion of the trimming line holders 50 sandwiched and oscillateably mounted between the top and bottom portions D30/60 with its bottom having a cylindrical cavity rotatably riding on the cylindrical projection 62, but with the trimming line holes 51 configured and mounted to extend above the top rings 31 of the top portion. This mounting allows each of the oscillateable holder 50 and its extended trimmer line to move back when the trimmer line (not illustrated in FIG. 19 for simplicity purposes, but note, e.g., trimmer line 2 in FIG. 10) to move back when the line hits a relatively hard object, all in accordance with the principles of the invention as described above.

The top portion head D30 is fastened to the bottom base portion 60 by means of, for example, the screws 70 screwed through the openings 71 to engage with the bottom portion 60. When connected, the peripheral lip 35 sits on top of the peripheral ledge 63 with the projection 64 mating with the peripheral alignment slot (not seeable in FIG. 19 but seeable in FIGS. 18A & 18B at about the one thirty (1:30) o'clock position in FIG. 18A). This provides a very stable interface between the top and base portions or members D30/60.

If a four trimming line holder arrangement is desired, the openings 32 and their corresponding mounts 62 with two additional, rotatable holders 50 with inserted trimmer lines (2) used. Washers or other lubricating or smooth members can be added or other wear or lubricating surfaces of, for example, metal, could be used, if so desired, on the relatively moveable, bearing surfaces.

The central openings 34 in the cylindrical housing 33 and 61 in the base 60 are used with appropriate mounting hardware to attach the assembled device (comparable to D1 of FIG. 10) to the power head of the available powered device, such as one of those illustrated in FIGS. 12-16. Radial "beams" 66 are included for enhanced, structural strength.

The body of the top head portion D30 can be made of many different materials, for example, plastic, high impact Nylon (33%) with the balance made of fiberglass, melted together and molded to produce the end product. Exemplary, approximate dimensions for the embodiment of the top member D30 of FIG. 18 can be comparable to the top member D3 of FIGS. 10 & 10A:

Triangular Embodiment

Figure 20:
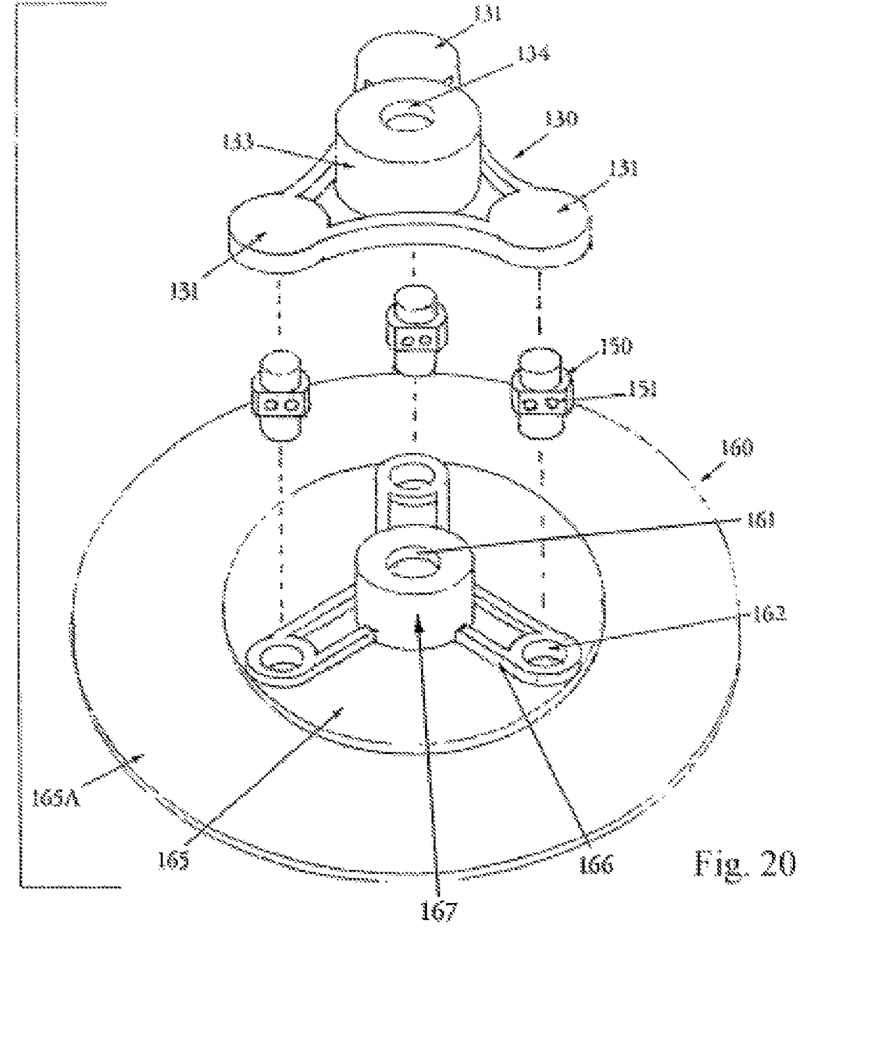
FIG. 20 is likewise an exploded view of a still further, exemplary embodiment or mode of the present invention in which the top member (160) of generally triangular configuration has a series of, for example, three, radially extended, separated arms, the distal ends (131) of which each include below it a separable, trimmer line holder part, with the circular bottom, protective plate or member having a substantially extended diameter for further trimmer line protection.

Mode of FIG. 20

A further exemplary embodiment or mode of the invention is illustrated in FIG. 20 and has some similarity to the embodiment of FIG. 19 but having an exemplary three, trimming line holders 150 with dual hole sets 151 into which the trimming line (1, 2) is inserted for operation of the device. Additionally, the top, head portion or part 130 is somewhat triangular in over-all configuration, as compared to the circular top member D3 of FIGS. 10 & 10A and D30 of FIGS. 18/19, and with the combined bottom plate portions 165/165A having an overall diameter much larger than that of bottom member 60, which enhanced size serves to further protect the trimmer lines (2), particularly as they are rotated, from damage from beneath the main body portion (D3, D30) from rubbing against, for example, flat concrete, rocks and the like. The bottom plate portion 165A produces a greater, effective over-all diameter, producing, for example, a total of about ten (10") inches, for its over-all diameter, with the tip portions of the trimmer line (2) extending a bit past the over-all diameter of the device by, for example, a couple of inches or so. If so desired, the larger diameter, bottom plate 165A can be made of, for example, a separable metal plate configured to be easily detached from the rest of the base member 165 as the trimmer line (2) ends are used up, thereby exposing for cutting or macerating action the then shortened trimmer lines' distal ends.

As can be seen in FIG. 20, the triangularly configured, top member 160 has a series (for example, three) of radially extended, separated arms, the distal ends 131 of which each include a oscillateable, trimmer line holder 150. The three, radially extending leg portions 131 each have on their respective undersides a cylindrical cavity to mate with the cylindrical top barrel of a respective trimmer line holder 150 while the cylindrical opening 162 mate with and hold the bottom cylindrical barrel member of the holders 150, which interfaced mountings allow each holder 150 to oscillate back and return when its associated trimmer line (2) hits any relatively hard surface, in accordance with the principles of the present invention. When assembled, the top, cylindrical center 167 of the bottom member 160 extends up into and nests within the interior of the top cylindrical member 133 on the top member 130, holding the two elements or members together in frictional engagement and further may be held together by the mounting hardware, if so desired.

The central openings 134 & 161 provide a way to mount the assembled device (like D1) onto a powered piece of machinery (e.g., FIGS. 12-16) using appropriate hardware, in similar fashion to central openings 34 & 61.

It is noted in general that the trimmer line holders (50/150) can be of many different designs and the hook configuration of the trimmer line holder portion of the line holder can take many forms and only a some exemplary ones have been shown and/or described. However, preferably the line holder portion should have effectively at least two holes or two channels or more preferably four or more, each pair allowing easily inserting and removal of a doubled-over trimmer line (1, 2) with a central member between the holes or channel, either opened at the back and/or open at the area above the channels, and preferably mounted to be able to at least optionally oscillate back about its center-line's longitudinal axis when its respective trimmer line strikes orthogonally against a relatively hard object or surface, in accordance with the principles of the present invention.

Figure 9B:
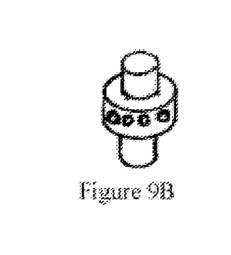

There are many ways for the separable, trimmer-line-holder parts to be mounted on the body of the device (top and/or bottom members). Some differing, preferred, mount approaches for the trimmer line holders include, for example, (1) where the mounts are mounted on the upper surface of the top member which then serves as a substrate (note FIGS. 1-6) using appropriate securing devices (e.g., screws, bolts or other hardware, etc.) extending through, for example, appropriate mounting holes (see, e.g., the rear holes clearly seeable in the trimmer line holders of FIGS. 1-6), and (2) where there is at least one, "vertically" extending, cylindrical barrel portion on one element and a mating cavity/hole on another element or member for mounting the line holder mounts on the body of the device and a like mating cavity/hole on either one or both of the other element(s) (holder, top and bottom members; note FIGS. 7-9B and 19 & 20), that is, for example, the line holder mounts include, for example, at least one cylindrically shaped, "vertical" extension extending either up or down from the trimmer line holder portion to mate with a like configured cylindrical cavity or hole in either the top head member (D3/D30/130) or the bottom protective member (D2/160; FIGS. 7-9B and 19 & 20; or vice versa) or where there are two cylindrically shaped, "vertical" extensions extending both up and down from opposite sides of the trimmer line holder portion to mate with like configured cylindrical cavities or holes in either the top head member or the bottom protective member (FIGS. 9B & 20; or vice-versa) or a "vertical" cylindrical projection being used at least on one side of the holder mating with a like cavity or hole on either the top or bottom members and a "vertical" cylindrically shaped barrel projection being used on one side of the holder mating with a like cavity or hole on either the top or bottom members (FIGS. 9B, 19 & 20).

Also, the separate bottom member could in essence be eliminated, using only a top member or head or vice-versa, with the top and bottom members being in effect integrated together into one single piece, part or member having a top portion and a bottom portion in a single structure. In this context it should be understood that, in the embodiments/modes of FIGS. 10-10B, 19 & 20, the three basic elements, namely, the bottom member (D2/60/160), the top member (D3/30/130) and the line holder parts (50/150), positioned evenly in a balanced array, are each separable from one another with each being an independent part. (Within the context of this application, the phrase "in a balanced array" merely means that the line holder parts are spaced from one another and about the trimmer head disk and have such a weight that when the disk is rotated at a relatively high speed, the disk does not unreasonably vibrate or shake. Ideally and preferably the circular disk and the holder parts thereon are spaced substantially equally apart near or at the periphery of the disk, for example, at the 12 and 6 o'clock positions.)

It thus should be understood that the foregoing designs, configurations, dimensions, materials, variations and alternatives, etc., are merely exemplary but with them or at least some of them being preferable, and many other changes are possible within the teachings of the present invention. Thus, it is further noted that the embodiments of the various hook/disk, trimmer-line-head systems illustrated and described herein in detail for exemplary purposes are of course subject to many different variations in structure, design, application and methodology. Because many varying and different embodiments may be made within the scope of the inventive concept(s) herein taught, it is to be understood that the details herein generally are to be interpreted as illustrative and not in a limiting sense, unless otherwise claimed below.

What is claimed is:

1. A flexible, trimmer line system for cutting vegetation comprising a powered device providing rotary power at a power end; a flexible, line-trimming-head add-on attached to the power end of said powered device for rotation, said trimmer-line-head add-on comprising a protective base portion; a main trimmer head top portion having an upper side and a bottom side, the bottom side attached to said protective base forming a combined head top portion and base portion structure; and a series of at least two, separable, peripherally spaced, line holder parts attached to said upper side of said trimmer head top portion so that said line holder parts oscillate back and forth about respective vertical axes and located adjacent to the periphery of said trimmer head top portion spaced a hundred and eighty) (180° degrees apart from one another, said line holder parts having one or more line holder attachments capable of accepting and holding one or more respective folded-back, flexible, trimming lines in said line holder attachments when said base portion, said trimmer head top portion and said line holder parts, attached together as an integral unit, are rotated at a relatively high speed by said powered device, causing said trimming lines to move straight, radially out under the action of centrifugal force but allowing the trimming lines to move backwards due to impeding forces and then allowing each respective line holder part to oscillate back urging the trimming lines back toward a radial position.

2. The flexible, trimming line system of claim 1, wherein said limited amount of oscillating swing back is about ninety) (90° degrees.

3. The flexible, trimming line system of claim 1, wherein said combined head top portion and base portion structure has a circular periphery past which the flexible trimmer lines distally are extended when attached to said line holder parts for trimming use and rotated at a relatively high speed.

4. The flexible, trimming line system of claim 3, wherein each of the line holder attachments defines at least three, spaced but adjacent, side-by-side, parallel, backwardly extending, hook fingers with the middle hook finger serving as a central member about which the folded-back, flexible, trimming line is inserted with a central crook of the folded-back line being wrapped around said central member and with an adjacent portion of the line positioned in the spaces between said central member and the two other, outer, hook fingers with said central member extending over the respective flexible line with the distal portions of the line extending past said periphery.

5. The flexible, trimming line system of claim 4, wherein each of the line holder attachments defines at least five, spaced but adjacent, side-by-side, parallel, backwardly extending, hook fingers with the second and fourth hook fingers each serving as a central member about which a separate folded-back, flexible trimming line is inserted with a central crook of the folded-back line being wrapped around a respective one of said central member and with the rest of the adjacent portion of the trimmer line positioned in the spaces formed between the two adjacent, other, finger members, presenting a total of four line segments extending out of the front of a respective line holder part past said periphery.

6. The flexible, trimming line system of claim 3, wherein each of the line holder attachments defines at least two spaced apart but adjacent, parallel holes extending from end-to-end completely through their respective line holder part, with the material between each of said two holes serving as a central member about which a respective, bent back, flexible trimming line is positioned with a central crook of the bent back line being wrapped around its respective central member and with the rest of the line extending completely through said holes with the distal ends of each flexible trimming line extending out of and past its respective line holder part and said periphery of said combined head top portion and base portion structure.

7. The flexible, trimming line system of claim 1, wherein said main trimmer head top portion has a series of radially extended, separated arms, the distal ends of which each include a trimmer line holder part below a respective separated arm.

* * * * *